United States Patent
Huang et al.

(10) Patent No.: US 11,443,931 B1
(45) Date of Patent: Sep. 13, 2022

(54) TWO-VOLUME CRYOABLATION CELL APPARATUS AND ABLATION METHOD THEREOF FOR LA-ICP-MS ANALYSIS OF FLUID INCLUSION

(71) Applicant: Institute of Geology and Geophysics, Chinese Academy of Sciences, Beijing (CN)

(72) Inventors: Liangliang Huang, Beijing (CN); Hongrui Fan, Beijing (CN); Heping Zhu, Beijing (CN)

( * ) Notice: Subject to any disclaimer, the term of this patent is extended or adjusted under 35 U.S.C. 154(b) by 0 days.

(21) Appl. No.: 17/655,744

(22) Filed: Mar. 21, 2022

(30) Foreign Application Priority Data

Mar. 25, 2021 (CN) .......................... 202110319807.1

(51) Int. Cl.
*H01J 49/04* (2006.01)
*G01N 1/04* (2006.01)
(Continued)

(52) U.S. Cl.
CPC ............ *H01J 49/0418* (2013.01); *G01N 1/04* (2013.01); *G01N 1/42* (2013.01); *H01J 49/105* (2013.01);
(Continued)

(58) Field of Classification Search
CPC .... H01J 49/0418; H01J 49/105; H01J 49/165; G01N 1/04; G01N 1/42; G01N 2001/045
See application file for complete search history.

(56) References Cited

U.S. PATENT DOCUMENTS 8,742,334 B2* 6/2014 Molloy ................. H01J 49/105
359/398
9,679,753 B2* 6/2017 Hannigan ............... F25B 21/02
(Continued)

FOREIGN PATENT DOCUMENTS

CN 103063575 A 4/2013
CN 104777155 A 7/2015
(Continued)

OTHER PUBLICATIONS

Direc chdmical analysis of frozen ice cores by UV-laser ablation ICPMS Wolfgang Miller, J. Micharel G. Shelley and Sune Olander Rasmussen. Received Aug. 12, 2011, Accepted Sep. 26, 2011 DOI: 10.10242g.
(Continued)

*Primary Examiner* — Wyatt A Stoffa

(57) ABSTRACT

A two-volume cryoablation cell apparatus and an ablation method thereof for LA-ICP-MS analysis of a fluid inclusion are provided. The two-volume cryoablation cell apparatus includes an ablation cell base having a square metal substrate and a metal abutment disposed on the metal substrate and shaped as a hollow cylinder; a cryogenic component including a cryogenic stage disposed on an axis of the metal abutment and configured to hold a sample; a small-volume ablation cell positioned above the cryogenic stage and in contact with an upper surface of the sample during use, wherein the small-volume ablation cell is of a hollow cylindrical shape with a transparent closed upper portion and an open lower portion; and an ablation cell cover body capable of being buckled on an upper opening of the metal abutment during use and configured to seal the sample within the metal abutment.

9 Claims, 7 Drawing Sheets

(51) Int. Cl.
 H01J 49/10 (2006.01)
 H01J 49/16 (2006.01)
 G01N 1/42 (2006.01)
(52) U.S. Cl.
 CPC ...... *H01J 49/164* (2013.01); *G01N 2001/045* (2013.01)

(56) References Cited

U.S. PATENT DOCUMENTS

| | | | |
|---|---|---|---|
| 11,092,519 B1* | 8/2021 | Hilliard | G01N 35/0099 |
| 11,353,379 B2* | 6/2022 | Hilliard | G01N 1/44 |
| 2012/0069524 A1* | 3/2012 | Schulz-Harder | H01L 23/473 |
| | | | 361/716 |
| 2012/0104244 A1* | 5/2012 | Verbeck, IV | G01N 33/28 |
| | | | 250/282 |
| 2013/0192392 A1* | 8/2013 | Strunk | G01K 11/165 |
| | | | 73/865.9 |
| 2014/0070085 A1 | 3/2014 | Molloy et al. | |
| 2016/0042932 A1* | 2/2016 | Hannigan | B23K 26/36 |
| | | | 250/288 |
| 2017/0299522 A1* | 10/2017 | Vanhaecke | G01N 1/04 |
| 2022/0135666 A1* | 5/2022 | Jones | A61K 31/4196 |
| | | | 424/144.1 |
| 2022/0208522 A1* | 6/2022 | Yang | H01J 37/32266 |

FOREIGN PATENT DOCUMENTS

| | | |
|---|---|---|
| CN | 206292158 U | 6/2017 |
| CN | 110196275 A | 9/2019 |
| CN | 110658250 A | 1/2020 |
| CN | 111180306 A | 5/2020 |
| CN | 211122659 U | 7/2020 |
| CN | 211426367 U | 9/2020 |
| CN | 111896527 U | 11/2020 |
| CN | 113063643 A | 7/2021 |
| EP | 3240014 A1 | 11/2017 |
| JP | 6980356 B1 | 12/2021 |

OTHER PUBLICATIONS

New Techniques of Major and Minor Elemental Analysis in Individual Fluid Inclusion—Laser Ablation Inductively Coupled Plasma Mass Spectrometry (LA-ICP-MS) Hu Sheng-hong, HU Zhao-chu, LIU Yong-sheng, LU Yan, LIN Sou-lin, GAO Shan (1. Faculty of Earth Sciences, China University of Geosciences, Wuhan 430074, China; 2. Department of Geology, Northwest University, Xi'an 710069, China), Oct. 2001.

First Office action of Chinese patent application with application No. 202110319807.2.

* cited by examiner

TWO-VOLUME CRYOABLATION CELL APPARATUS AND ABLATION METHOD THEREOF FOR LA-ICP-MS ANALYSIS OF FLUID INCLUSION

TECHNICAL FIELD

Embodiments of the present disclosure generally relate to in situ laser micro-area chemical composition analysis of fluid inclusions, and more particularly to a two-volume cryoablation cell apparatus and an ablation method thereof for IA-ICP-MS analysis of a fluid inclusion.

BACKGROUND ART

Laser ablation-inductively coupled plasma-mass spectrometry (LA-ICP-MS for short) analysis as an important in-situ micro-area analysis method has been widely applied to the analysis and detection of samples in different fields such as geology, materials, metallurgy, semiconductors and biology because it can rapidly and quantitatively detect a variety of micro and trace elements simultaneously. At the present stage, most of the LA-ICP-MS analysis focuses on in situ micro-area (several micrometers to tens of micrometers) element content and isotope ratio analysis, geological age determination and other works for the surface of a solid mineral sample. However, for the fluid inclusions buried in the (deep) part of the minerals, generally small in volume, and, with a small amount of samples to be analyzed (which contain fluid inclusion components in the form of a gas/liquid state, the fluid inclusion components are here also known as fluid inclusion constituents or as fluid inclusion species), no in-depth analytical testing, work, has been performed.

In the field of geological research, fluid inclusions are paleo-fluids sequestered in minerals and rocks, and are the only direct records of fluids involved in the internal geological process of the earth. The LA-ICP-MS in-situ micro-area component analysis for the fluid inclusions may solve important issues such as chemical composition, source, metal element distribution and evolution process of ore-forming fluids of metallic and non-metallic deposits, and may promote the progress in metallogenic processes and theoretical researches on genesis of metallic deposits as the key technologies to understand the metallogenic process and genesis of ore deposits and guide the exploration of ore deposits.

At present, an LA-ICP-MS analysis device is mainly used to analyze solid mineral samples. A conventional ablation cell used, by the LA-ICP-MS analysis device has an integrally cylindrical or square space inside, with a large volume. The volume of an ablation cell designed commercially or designed by each laboratory is about 100 cm$^3$ to 200 cm$^3$. Due to the large volume of a solid mineral sample, its surface is flat and easy to focus. Therefore, when an existing large-volume ablation cell is used for an analysis test, the sample may be ablated uniformly and stably, and the purge time is long enough to send sample aerosol into a mass spectrometer for analysis. In general, during the experiment (taking, a zircon U-Pb dating experiment as an example), the test time of a measuring point in the conventional ablation cell is about 80 seconds in which the first 20 seconds is for carrier gas purging, the subsequent 40 seconds is for ablation, and the last 20 seconds is for carrier gas purging to purge out the aerosol resulting from the laser ablation in the ablation cell for the next analysis.

However, the conventional ablation cell is not suitable for analyzing fluid inclusion samples at present. This is because for the LA-ICP-MS analysis of fluid inclusions, firstly, unlike the case where the volume of the solid mineral sample is large, the volume of a single fluid inclusion sample is very small, so that if the volume of a cavity of the ablation cell is too large, aerosols of the fluid inclusion sample may be diluted and may not be quickly transferred into the mass spectrometer as many as possible. Secondly, due to the difference in physical properties between, fluid inclusion components and host minerals of the fluid inclusion components (the two together constitute a sample of the fluid inclusion, which is referred to as "a fluid inclusion sample"), the host minerals are easily thermally cracked or exploded in a laser ablation process, which would cause the fluid inclusion components to dissipate, resulting in distorted analysis results and ineffective fluid inclusion analysis. Thirdly, since the fluid inclusion components have a certain internal pressure in the fluid inclusion sample, they are easily vaporized in a very short time when they are opened by ablation, resulting in a failure to obtain uniform and stable sample signals of the fluid inclusion components in a long term. In this way, it is extremely difficult to process data in a later stage.

Accordingly, there is a need of developing and improving an ablation cell apparatus for LA-ICP-MS analysis of a fluid inclusion, so as to realize the effective LA-ICP-MS analysis of the fluid inclusion.

SUMMARY OF THE INVENTION

Embodiments of the present disclosure provide a two-volume cryoablation cell apparatus and an ablation method thereof for LA-ICP-MS analysis of a fluid inclusion to at least partially solve one of the above-mentioned problems in the prior art.

In a first aspect of the present disclosure, there is provided a two-volume cryoablation cell apparatus for LA-ICP-MS analysis of a fluid inclusion, including:

an ablation cell base, having a square metal substrate and a metal abutment disposed on the metal substrate and shaped as a hollow cylinder, wherein the ablation cell base forms a large-volume ablation cell, wherein a middle portion of the metal substrate has a first through hole and is provided with a first light-transmitting glass sheet;

the metal abutment is coincident with the metal substrate on an axis, and has a second through hole arranged along the axis; an upper opening of the second through hole is configured to allow a fluid inclusion sample to be placed therethrough, and a lower opening of the second through hole is aligned to the first through hole and configured to guide light transmitted through the first light-transmitting glass sheet;

a first gas inlet adapter for introducing a helium gas, a first gas outlet adapter for discharging the helium gas, a liquid inlet adapter for introducing liquid nitrogen, a liquid outlet adapter for discharging the liquid nitrogen and a position adjusting knob are disposed on a peripheral wall of the metal abutment;

a cryogenic component, including a cryogenic stage disposed on the axis of the metal abutment and configured to hold, the sample, wherein the cryogenic stage has a fluid channel inside and is provided, on an axis thereof, with a third through hole for transmitting light, and the fluid channel has one end connected with the liquid inlet adapter via, a liquid inlet pipeline and the other end connected with the liquid outlet adapter via a liquid outlet pipeline;

a small-volume ablation cell, positioned above the cryogenic stage and in contact with an upper surface of the sample during, use, the small-volume ablation cell being of a hollow cylindrical shape with a transparent closed upper portion and an open lower portion, wherein the small volume ablation cell is provided with a second gas, inlet adapter on a side wall near a lower portion thereof and a second gas outlet adapter on a side wall near an upper portion thereof, wherein the second gas inlet adapter is connected with the first gas inlet adapter via a hose, and the second gas outlet adapter is connected with the first gas outlet adapter via a hose;

the small-volume ablation cell is integrally installed on a mobile support which is provided therein with a thread matched with a screwing portion; the screwing portion is provided with the position adjusting knob on the peripheral wall of the metal abutment, so as to drive the mobile support and adjust a position of the small-volume ablation cell when the position adjusting knob is rotated; and an axis of the screwing portion is aligned with the axis of the cryogenic stage;

and, an ablation cell cover body, which is capable of being buckled on the upper opening of the metal abutment during use, and seals the sample within the metal abutment, wherein a middle portion of the ablation cell cover body has a fourth through hole, and is provided with a second light-transmitting glass sheet.

In some embodiments of the present disclosure, the first gas inlet adapter and the first gas outlet adapter are arranged along a first direction, the liquid inlet adapter and the liquid outlet adapter are arranged along a second direction, and the first direction and the second direction are perpendicular to each other.

In some embodiments of the present disclosure, the peripheral wall of the metal abutment is further provided with a clamping portion for clamping the ablation cell cover body; and after the ablation cell cover body is clamped to the clamping portion, the axis of the ablation cell cover body is capable of coinciding with the axis of the metal abutment.

In some embodiments of the present disclosure, the clamping portion includes a first clamping portion located above the first gas inlet adapter, a second clamping portion located above the liquid inlet adapter, and a third clamping portion located between the gas outlet adapter and the liquid outlet adapter, wherein the first clamping portion, the second clamping portion and the third clamping portion each have an inwardly disposed groove to clamp an edge of the ablation cell cover body; the third clamping portion is further provided with a thread adjusting portion for adjusting a position of the third clamping portion, and the thread adjusting portion is configured to allow the third clamping portion to approach and clamp the ablation cell cover body after the ablation cell cover body is clamped by the first clamping portion and the second clamping portion.

In some embodiments of the present disclosure, the position adjusting knob is located between the first gas inlet adapter and the liquid outlet adapter or between the first gas outlet adapter and the liquid inlet adapter; and the ablation cell cover body, the cryogenic stage, the metal abutment and the metal substrate are arranged from top to bottom, and coincide with each other on the axis.

In, some embodiments of the present disclosure, the mobile support is of a square shape, and one end of the mobile support away from the screwing portion is provided with an elastic clamping, portion, which is configured to clamp the small-volume ablation cell; and the small-volume ablation cell is integrally formed from a glass material, and a position of the small-volume ablation cell is adjusted to be above the cryogenic stage by the mobile support during use.

In some embodiments of the present disclosure, the first gas outlet adapter is communicated with a first end of a three-way adapter via a hose, a second end of the three-way adapter is introduced, with a helium gas, and a third end of the three-way adapter is configured to discharge the helium gas; the helium gas in the small-volume ablation cell flows into the first end of the three-way adapter via the first gas outlet adapter and flows out via the third end, under the action of the three-way adapter.

In some embodiments of the present disclosure, the first end is located on a first branch of the three-way adapter, the second end is located on a second branch of the three-way adapter, and the third end is located on a third branch of the three-way adapter; the second branch and the third branch are arranged in one direction, and the first branch is perpendicular to the second branch and the third branch; and the second branch has a constriction design near the first branch, and the third branch has a constriction design near the first branch.

In some embodiments of the present disclosure, when the sample is observed microscopically, light passes through the first, through hole via the first light-transmitting glass sheet, and irradiates the sample via the third through hole of the cryogenic stage after passing through the second through hole; and when the sample is ablated by laser, the laser passes through the fourth through hole via, the second light-transmitting glass sheet, and is introduced to the surface of the sample on the cryogenic stage after passing through the upper portion of the small-volume ablation cell.

In a second aspect of the present disclosure, there is provided a two-volume cryoablation method for LA-ICP-MS analysis of a fluid inclusion, in which the two-volume cryoablation cell device for LA-ICP-MS analysis of the fluid inclusion method defined in any one of claims 1 to 9 is used, wherein the method includes:

placing and fixing the fluid inclusion sample on the cryogenic stage, and buckling the ablation cell cover body on the upper opening of the metal abutment;

adjusting a position of the small-volume ablation cell until the small-volume ablation cell is located above the cryogenic stage and contacts the upper surface of the sample;

passing light through the first through hole via the first light-transmitting glass sheet to irradiate the sample via the third through hole of the cryogenic stage after passing through the second through hole, and adjusting the small-volume ablation cell to be positioned above fluid inclusion components in the sample by microscopically observing the fluid inclusion components in the sample;

introducing the helium gas through the first gas inlet adapter, and discharging the helium gas via the first gas outlet adapter after the helium gas passes through the second gas inlet adapter and the second gas outlet adapter;

introducing the liquid nitrogen through the liquid inlet adapter and discharging the liquid nitrogen via the liquid outlet adapter after the liquid nitrogen passes through the cryogenic stage; and passing laser through the fourth through hole via the second light-transmitting glass sheet and directing the laser to the upper surface of the sample on the cryogenic stage after the laser passes through the upper portion of the small-volume ablation cell in order to ablate the sample.

DESCRIPTION OF THE DRAWINGS

By way of example only, embodiments of the present disclosure will now be described with reference to accompanying drawings, in which the same or similar reference numerals refer to the same or similar elements.

DETAILED DESCRIPTION OF THE INVENTION

Figure 1:
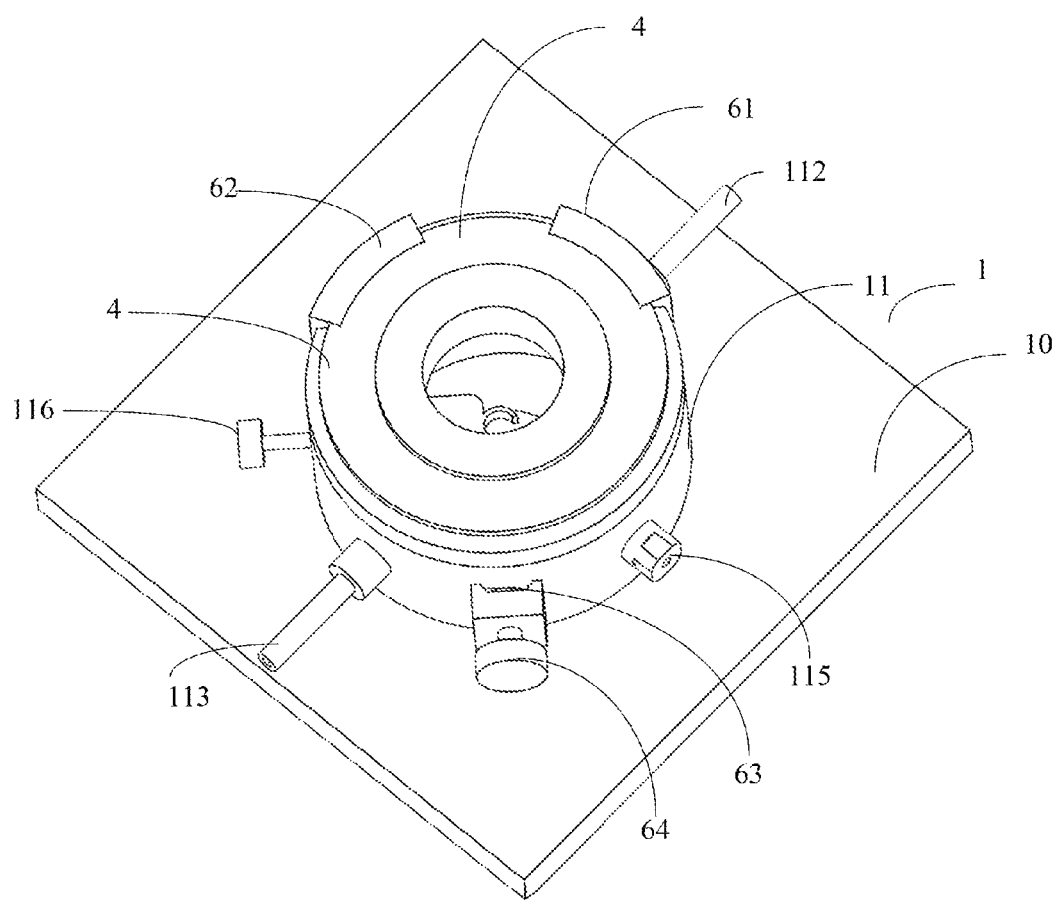
FIG. 1 shows a schematic diagram showing a structure of a two-volume cryoablation cell apparatus for LA-ICP-MS analysis of a fluid inclusion according to an exemplary embodiment of the present disclosure.

Embodiments of the present disclosure will be described in more detail below with reference to accompanying drawings. While certain embodiments of the present disclosure are shown in the accompanying drawings, it should be understood that the present disclosure may be embodied in various forms and should not be construed as limited to the embodiments set forth herein, but rather are provided for more thoroughly and completely understanding the present disclosure. It should be understood that the accompanying drawings and, the embodiments of the present disclosure are only used for exemplary purposes, and are not intended to limit the protective scope of the present disclosure.

In an exemplary embodiment of the present disclosure, when a two-volume cryoablation cell for LA-ICP-MS analysis of a fluid inclusion is designed, it is necessary to comprehensively consider a cavity volume of the ablation cell, a size and a quantity of samples that may be accommodated, a pneumatic layout, a carrier gas transfer efficiency and other factors. Particularly, for the LA-ICP-MS analysis of the fluid inclusion, firstly, since the amount of an individual fluid inclusion sample is extremely small, it is desirable to reduce the cavity volume of the ablation cell to prevent aerosols of the fluid inclusion sample from being diluted. Meanwhile, it is desirable to optimize the pneumatic layout of the cavity of the ablation cell to achieve high sample aerosol transfer efficiency, so as to quickly transfer as many aerosols of the fluid inclusion sample as possible into the mass spectrometer for efficient sample analysis. Secondly, in order to prevent the loss of the fluid inclusion components due to thermal cracking or explosion of the host minerals in the laser ablation process, it is necessary to keep the fluid inclusion components, which are in the form of a gas/liquid state in the fluid inclusion samples, in a solid phase (including a homogeneous solid phase or a near solid phase). Finally, in order to prevent the internal pressure of the fluid inclusion components themselves from causing gasification in a very short time when the components are opened by ablation, it is also necessary to keep the fluid inclusion components, which are in the form of a gas/liquid state in the fluid inclusion samples in a solid phase, so as to reduce the pressure of the fluid inclusion components and keep the fluid inclusion components in the solid phase for a longer time, thereby obtaining uniform and stable sample signals about the fluid inclusion components in a longer term, which is convenient for later data processing.

A number of exemplary embodiments of the present disclosure will be described below with reference to accompanying drawings. As shown in FIG. 1 to FIG. 7, embodiments of the present disclosure provide a two-volume cryoablation cell apparatus for LA-ICP-MS analysis of a fluid inclusion (also referred to as "a two-volume cryoablation cell apparatus for performing LA-ICP-MS analysis on a fluid inclusion" or "a two-volume cryoablation cell for LA-ICP-MS analysis of a fluid inclusion").

Figure 2:
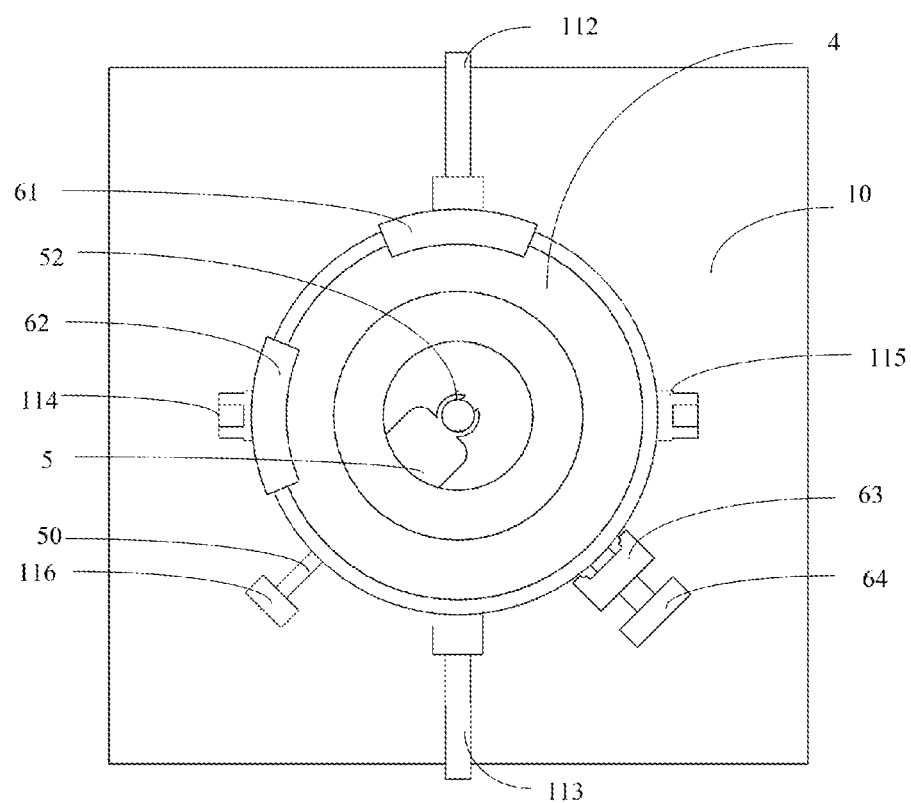
FIG. 2 shows a schematic diagram showing a structure of a two-volume cryoablation cell apparatus for LA-ICP-MS analysis of a fluid inclusion in a top view according to an exemplary embodiment of the present disclosure.
Figure 3:
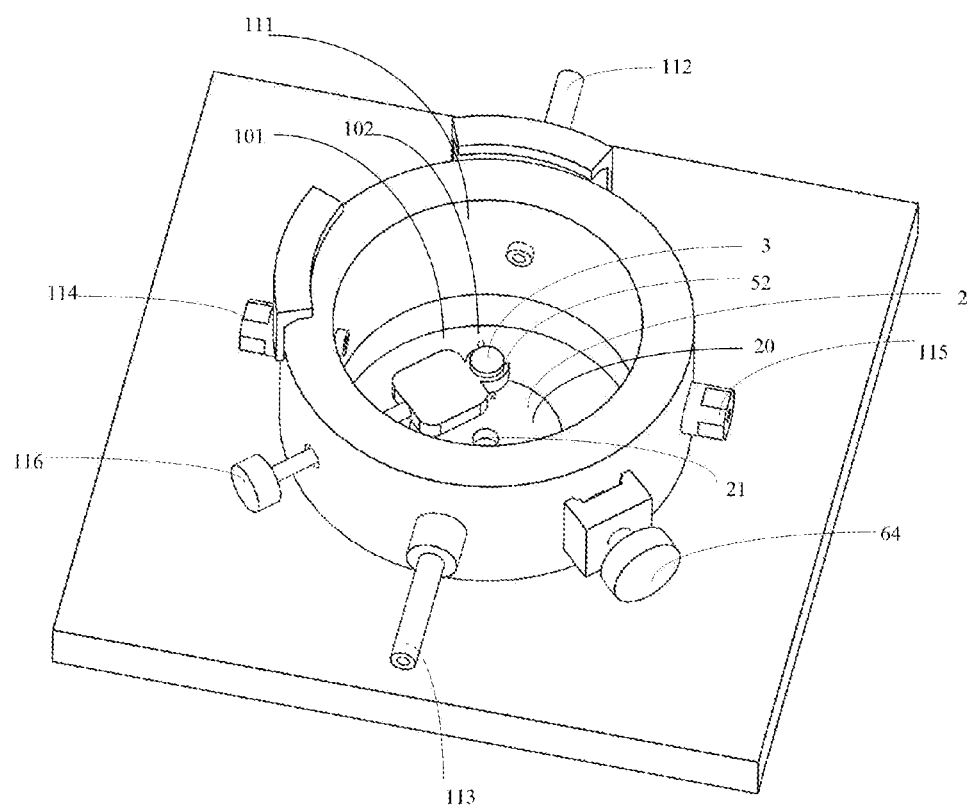
FIG. 3 shows a schematic diagram showing a structure of a two-volume cryoablation cell apparatus for LA-ICP-MS analysis of a fluid inclusion when an ablation cell cover body is removed according to an exemplary embodiment of the present disclosure.

The two-volume cryoablation cell apparatus for LA-ICP-MS analysis of the fluid inclusion shown in FIG. 1 to FIG. 3 includes an ablation cell base 1, a cryogenic component 2, a small-volume ablation cell 3 and an ablation cell cover body 4.

As shown in FIG. 1, the ablation cell base 1 has a square metal substrate 10 and a metal abutment 11 disposed on the metal substrate 10 and shaped as a hollow cylinder. As an alternative embodiment, the metal substrate 10 may be of a circle shape or the like. The metal abutment 11 may be of a hollow square column shape or the like. The ablation cell base 1 forms a large-volume ablation cell (also referred to as a "large ablation cell"). More particularly, an internal cavity formed by the metal substrate 10 and the metal abutment 11 forms an, ablation space of the large-volume ablation cell. In terms of the size, the volume of the internal cavity of the large-volume ablation cell may be reduced to 5 $cm^3$ to 50 $cm^3$ (preferably 5 $cm^3$ to 10 $cm^3$), in order to hold the fluid inclusion sample for direct measurement.

As shown in FIG. 1 and FIG. 3, a first through hole 101 is provided in the middle portion of the metal substrate 10 and a first light-transmitting glass sheet 102 is mounted, on the metal substrate 10. For example, the first light-transmitting glass sheet 102 is capable of covering the first through hole 101, and the first through hole 101 may be sealed by arranging a sealing ring around the first through hole 101. Here, since the first through hole 101 is capable of transmitting light, the light may be transmitted upwards after passing through the first through hole 101 and the first light-transmitting glass sheet 102.

With reference to FIG. 1 and FIG. 3, the metal abutment 11 is coincident with the metal substrate 10 on an axis, and has a second through hole 111 arranged along the axis. An upper opening of the second through hole 111 is configured to allow the fluid inclusion sample to be placed therethrough, and a lower opening of the second through hole 111 is aligned with the first through hole 101 and configured to guide the light transmitted through the first light-transmitting glass sheet 102. The "axis" here refers to, for example, a line formed by connecting the center of each cross section. Taking the metal substrate 10 as an example, its axis is a line perpendicular to an upper surface of the metal substrate and passing through the center of the metal substrate.

As an example, in order to adapt to the detection of the fluid inclusion, the diameter of the second through hole 111 may be reduced, such that the volume of the cavity of the large-volume ablation cell is reduced and aerosols of the fluid inclusion sample are prevented from being diluted. At this time, a fluid inclusion sample with a larger size may be put into the second through hole 111 and directly ablated by laser, so as to realize direct detection of the fluid inclusion sample with a larger size.

As shown in FIG. 1 and FIG. 3, a first gas inlet adapter 112 for introducing a helium gas, a first gas outlet adapter 113 for discharging the helium gas, a liquid inlet adapter 114 for introducing liquid nitrogen, a liquid outlet adapter 115 for discharging the liquid nitrogen, and a position adjusting knob 116 are disposed on a peripheral wall of the metal abutment 11.

As an example, the first gas inlet adapter 112 has a first gas inlet for introducing the helium gas, and the first gas outlet adapter 113 has a first gas outlet for discharging the helium gas; and the liquid inlet adapter 114 has a liquid inlet for introducing the liquid nitrogen, and the liquid outlet adapter 115 has a liquid outlet for discharging the liquid nitrogen.

The first gas inlet adapter 112 and the first gas outlet adapter 113 are internally fluidly communicated, such that the helium gas may purge an interior of the entire ablation cell apparatus, so as to prepare for subsequent sample detection. The liquid inlet adapter 114 and, the liquid outlet adapter 115 are internally fluidly communicated as well, such that by introducing the liquid nitrogen into the metal abutment 11, a cooling effect on the fluid inclusion sample is achieved. As such, the fluid inclusion components in a gas/liquid state in the fluid inclusion sample are kept in a solid phase. As a preferred embodiment, in a process of detecting the sample, the liquid nitrogen and the helium gas should be kept in a dynamic process of continuous inflow and outflow to allow the overall measurement environment to remain stable.

As shown in FIG. 2 and FIG. 3, the first gas inlet adapter 112 and the first gas outlet adapter 113 are arranged along a first direction, the liquid inlet adapter 114 and the liquid outlet adapter 115 are arranged along a second direction, and the first direction and the second direction are perpendicular to each other. At this time, the first gas inlet adapter 112, the first gas outlet adapter 113, the liquid inlet adapter 114 and the liquid outlet adapter 115 are evenly distributed on the peripheral wall of the metal abutment 11.

Still referring to FIG. 3, the cryogenic component 2 includes a cryogenic stage 20 arranged on the axis of the metal abutment 11 (for example, at a central position) and configured to hold the sample. The cryogenic stage 20 has a fluid channel inside and is provided, on an axis (for example, at a center position) thereof with a third through hole 21 for transmitting light, wherein the fluid channel has one end connected with the liquid inlet adapter 114 via a liquid inlet pipeline (not shown), and the other end connected, with the liquid outlet adapter 115 via a liquid outlet pipeline (not shown).

Preferably, when the sample is placed above the cryogenic stage 20, it may be fixed (for example, detachably fixed, such as adhered; for another example, may be fixed with a sample clamp) on the cryogenic stage 20, so as to avoid movement. In some embodiments, the liquid inlet pipeline and the liquid outlet pipeline each may be made of a copper pipe, so as to facilitate the flow of a cryogenic liquid (for example, the liquid nitrogen). In addition, in the embodiment of the present disclosure, only the design of the cryogenic stage is adopted, and thus compared with a design incorporating heating and cryogenics, the apparatus is simpler in structure, lower in manufacturing cost and easier to control. In actual use, an operator or experimenter may directly control or set a temperature of the liquid nitrogen based on experience (such as an empirical value of solid phase temperature of the fluid inclusion components), such that the liquid nitrogen may be directly introduced onto the cryogenic stage to achieve temperature adjustment.

Preferably, the fluid channel may be curved or spiral. At this time, the liquid nitrogen flows into, the fluid channel inside the cryogenic stage 20 via the liquid inlet adapter 114 and the liquid inlet pipeline, and then flows out via the liquid outlet pipeline and the liquid outlet adapter 115 after the circulation, so as to cool the cryogenic stage 20 for cooling the fluid inclusion sample, such that the fluid inclusion components in the fluid inclusion sample in a gas/liquid state remain in a solid phase state. At this time, in a process ablating the fluid inclusion sample, the fluid inclusion components contained in the fluid inclusion sample will not be easily lost (for example, because the host minerals are easily thermally cracked or exploded in a laser ablation process, or since the host minerals are easily vaporized within a very short time when being opened by ablation due to the internal pressure of the fluid inclusion itself), and uniform and stable sample signals about the fluid inclusion components may be obtained in a long term, which is convenient for subsequent data processing.

Figure 4:
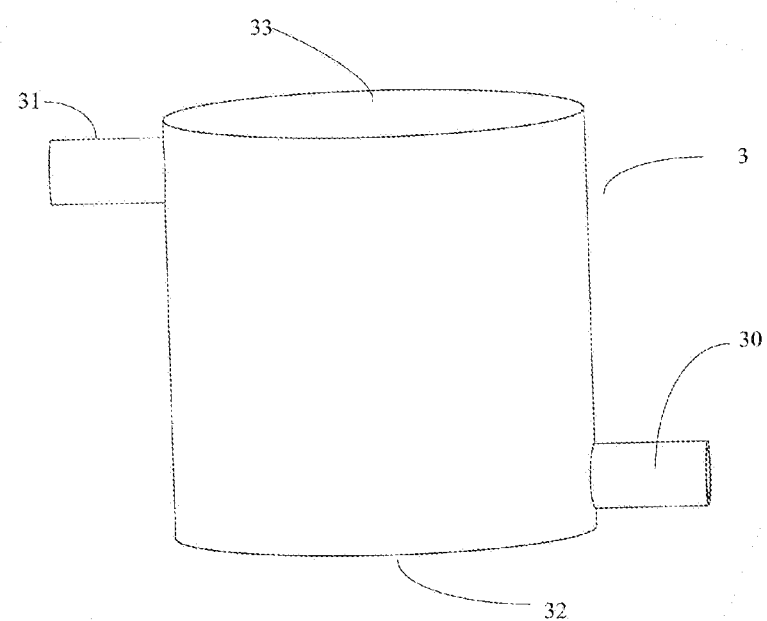
FIG. 4 shows a schematic diagram showing a structure of a small-volume ablation cell according to an exemplary embodiment of the present disclosure.

As shown in FIG. 3 and FIG. 4, a small-volume ablation cell 3 (which may also be referred to as a "small ablation cell") is located, above the cryogenic stage 20 and is in contact with (for example, in close proximity to) the upper surface of the sample during use. The small-volume ablation cell 3 is of a hollow cylindrical shape with a transparent closed upper portion 33 and an open lower portion 32.

As an example, compared with the large-volume ablation cell, the volume of the internal cavity of the small-volume ablation cell 3 may be further reduced, which may more effectively prevent the aerosols of the fluid, inclusion sample from being diluted. At this time, the laser may ablate the upper surface of the sample corresponding to the open lower portion 32 of the small-volume ablation cell 3 after passing through the transparent, closed upper portion 33 of the small-volume ablation cell 3. In this way, the aerosols of the fluid inclusion sample may be quickly transferred into the mass spectrometer as many as possible. In operation, for example, a fluid inclusion sample with a smaller size may be accommodated inside the small-volume ablation cell 3. At this time, since the inner cavity of the small-volume ablation cell 3 has a smaller volume, the aerosols of the fluid inclusion sample may be prevented from being diluted, thereby measuring the fluid inclusion effectively. In addition, since a design of the two-volume ablation cell with a large-volume ablation cell and a small-volume ablation cell is adopted, the apparatus may adapt to the measurement of the fluid inclusion, samples with different sizes, showing better flexibility.

As shown in FIG. 4, the small-volume ablation cell 3 is provided with a second gas inlet adapter 30 on a side wall near its lower portion 32 and a second gas outlet adapter 31 on a side wall near its upper portion 33. The second gas inlet adapter 30 is connected with the first gas inlet adapter 112 via a hose, and the second gas outlet adapter 31 is connected with the first gas outlet adapter 113 via a hose.

As an example, the helium gas flows into the second gas inlet adapter 30 through the hose via the first gas inlet adapter 112, and then flows out of the first gas outlet adapter 113 through the hose after passing through the second gas outlet adapter 31. In this way, both the large-volume ablation cell and the small-volume ablation cell are purged with the helium gas, and the aerosols of the sample may flow out quickly in a process of ablating the sample, which is convenient for subsequent further analysis. In some embodiments, a helical groove is provided in the inner wall of the small-volume ablation cell 3 from the second gas inlet, adapter 30 to the second gas outlet adapter 31, and the helical groove designed in this way is conducive to the rapid flow of the gas, which further improves the pneumatic layout.

Figure 5:
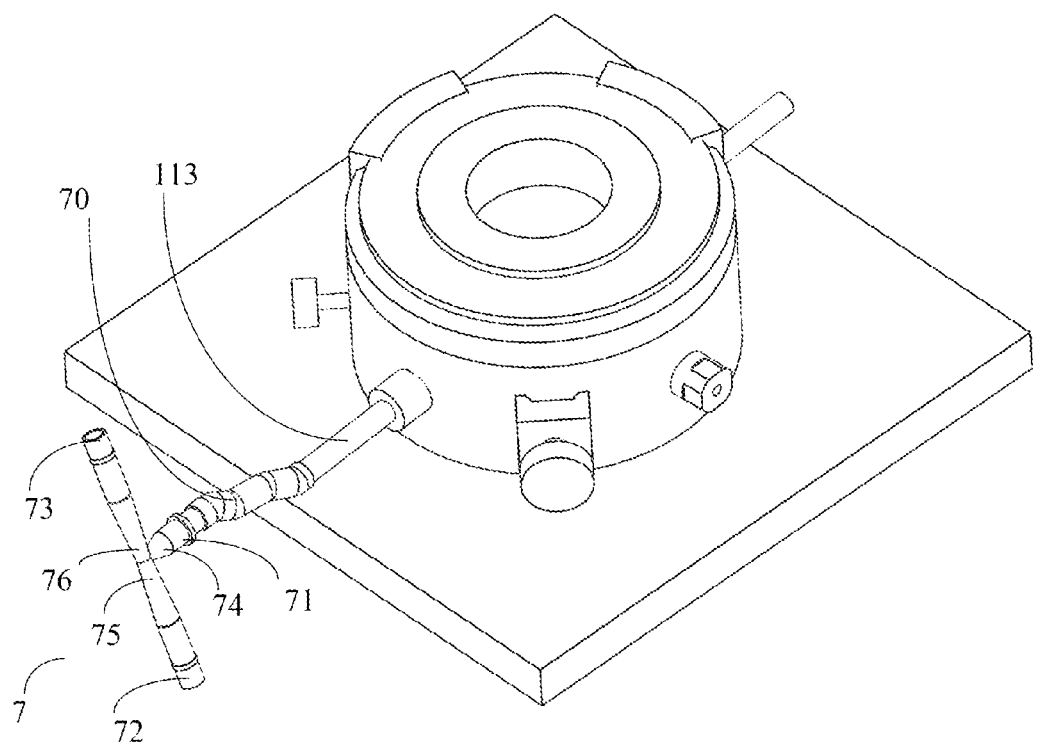
FIG. 5 shows a schematic diagram showing a structure of connecting a small-volume ablation cell and a three-way adapter according to an exemplary embodiment of the present disclosure.

As shown in FIG. 3 and FIG. 5, the first gas outlet adapter 113 may be communicated with a first end 71 (located on a first branch 74) of a three-way adapter 7 via a hose 70, and a helium gas is introduced from a second end 72 (located on a second branch 75) of the three-way adapter 7, and is discharged at a third end 73 (located on a third branch 76) of the three-way adapter 7. The gas in the small-volume ablation cell 3 flows into the first end 71 of the three-way adapter 7 via the first gas outlet adapter 113 and flows out via the third end 73, under the action of the three-way adapter 7.

Preferably, the second branch 75 and the third branch 76 of the three-way adapter 7 are arranged in one direction (at, this time, the second end 72 and the third end 73 are in one direction and face opposite sides), and the first branch 74 is perpendicular to the second branch 75 and the third branch 76. The first branch 74, the second branch 75 and the third branch 76 are in fluid communication with each other. Moreover, the second branch 75 of the three-way adapter 7 has a constriction design near the first branch 74, and the third branch 76 of the three-way adapter 7 further has a constriction design near the first branch 74, such that the helium gas flows into an outlet of the third end 73 from the second end 72. Accordingly, the gas within the three-way adapter 7 relatively easily flows out from the third end 73 rapidly as a whole.

Moreover, since the three-way adapter 7 and the small-volume ablation cell 3 are communicated, with each other, and have the above structural designs such as the constriction, the Venturi effect of the three-way adapter 7 may be utilized to allow the gas within the small-volume ablation cell 3 to flow into the first end 71 of the three-way adapter 7 via, the first gas outlet adapter 113 and flow out via the third end 73 (at this time, the pneumatic layout within the small-volume ablation cell 3 is optimized as well), such that the aerosols of the fluid inclusion sample may be more effectively and rapidly transferred into the mass spectrometer as many as possible.

Figure 6:
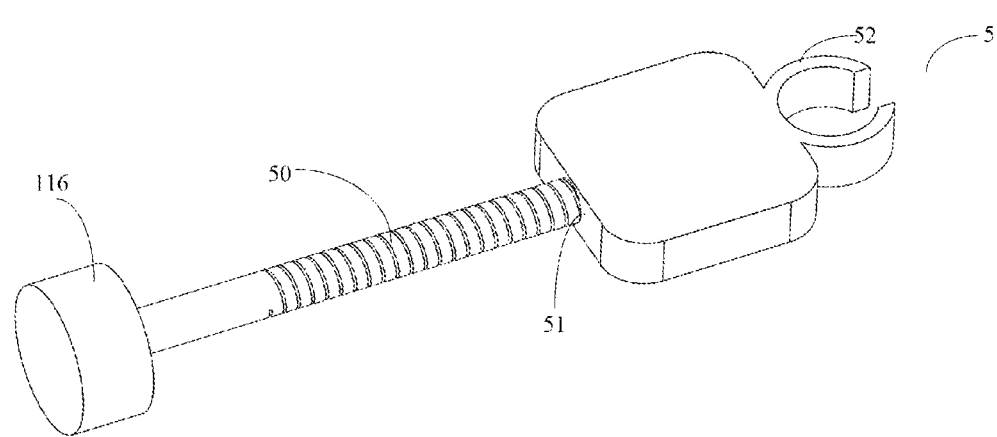
FIG. 6 shows a schematic diagram showing a structure of a mobile support according to an exemplary embodiment of the present disclosure.

As shown in FIG. 3 and FIG. 6, the small-volume ablation cell 3 is integrally mounted on the movable support 5, and the movable support 5 is provided therein with a thread 51 matching with the screwing portion 50. The screwing portion 50 is provided (formed) with a position adjusting knob 116 on the peripheral wall of the metal abutment 11 (for example, the position adjusting knob 116 is disposed at one end of the screwing portion 50 and is integrally formed with the screwing portion 50), so as to drive the movable support 5 when the position adjusting knob 116 is rotated and adjust the position of the small-volume ablation cell 3. The axis of the screwing portion 50 is aligned with the axis of the cryogenic stage 20.

As an example, due to the mutual threaded cooperation of the screwing portion 50 with the thread 51, the movable support 5 may be driven when the position adjusting knob 116 is rotated, so as to realize the position adjustment of the small-volume ablation cell 3 mounted on the movable support 5. In addition, the axis of the screwing portion 50 is aligned with the axis of the cryogenic stage 20. For example, the axis of the screwing portion 50 and the axis of the cryogenic stage 20 are perpendicular to and intersect with each other, at this time, the axis of the screwing portion 50 is aligned with a center position of the cryogenic stage 20. Accordingly, for a fluid inclusion sample with a larger size, the small-volume ablation cell 3 may also move on the surface of the sample, so as to realize the measurement of the sample at multiple points.

As an example, the small-volume ablation cell 3 is integrally formed with a glass material, and its position is adjusted to be above the cryogenic stage 20 by the movable support 5 during use. In some embodiments, the position adjusting knob 116 may be located between the first gas inlet adapter 112 and the liquid outlet adapter 115, or located between the first gas outlet adapter 113 and the liquid inlet adapter 114.

As an example, the movable bracket 5 may be of a square shape (for example, a square with rounded corners), and one end of the movable bracket 5 away from the screwing portion 50 is provided with an elastic clamping portion 52, which is configured to clamp the small-volume ablation cell 3. Since the elastic clamping portion 52 has a certain elasticity, the small-volume ablation cell 3 may be easily removed and replaced. At this time, small-volume ablation cells 3 with various diameters may be designed for actual measurement, so as to adapt to the requirements of different sample sizes or measurement environments. In addition, the position of the small-volume ablation cell 3 clamped on the elastic clamping portion 52 may be further adjusted, so as to meet measurement needs of fluid inclusion samples with different thicknesses, such that the small-volume ablation cell 3 may touch the upper surface of the sample when being adjusted to be above the sample.

Figure 7:
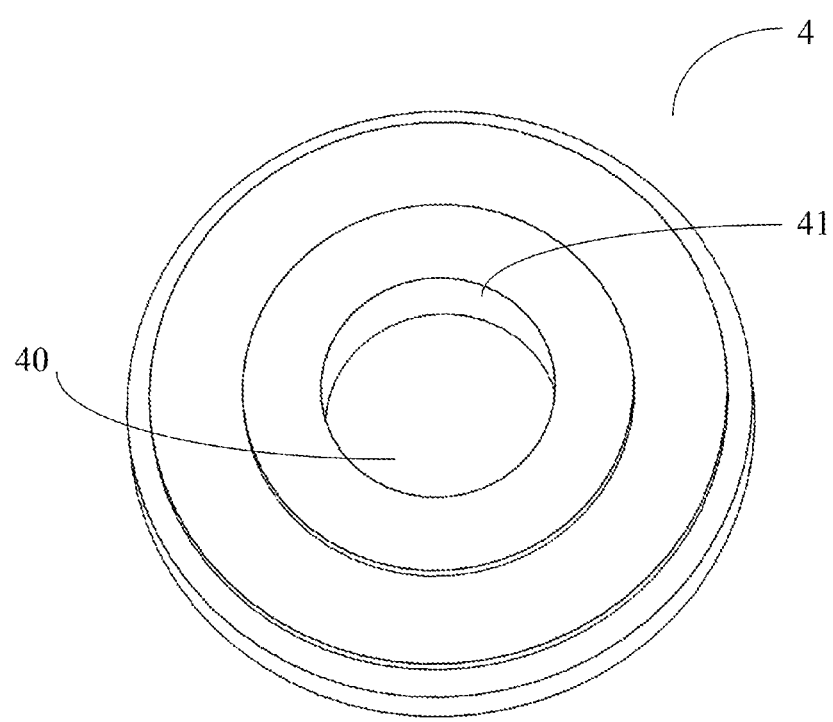
FIG. 7 shows a schematic diagram showing a structure of an ablation cell cover body according to an exemplary embodiment of the present disclosure.

As shown in FIG. 3 and FIG. 7, the ablation cell cover body 4 is a detachable component, which may be buckled on an upper opening of the metal abutment 11 during use, and seal the sample within the metal abutment 11. A fourth through hole 40 is provided in the middle portion of the ablation cell cover body 4 and a second light-transmitting glass sheet 41 is installed on the ablation cell cover body 4.

As an example, the second light-transmitting glass sheet 41 is capable of covering the fourth through hole 40, and a sealing effect on the fourth through hole 40 is achieved by providing a sealing ring around the fourth through hole 40. In some embodiments, the ablation cell cover body 4, the cryogenic stage 20, the metal abutment 11 and the metal substrate 10 are arranged from top to bottom and are coincident with each other on the axis.

As shown in FIG. 1 and FIG. 3, a clamping portion for clamping the ablation cell cover body 4 may be further disposed on the peripheral wall of the metal abutment 11, and after the ablation cell cover body 4 is clamped to the clamping portion, its axis may be mutually coincident with the axis of the metal abutment 11.

As an example, the clamping portion includes a first clamping portion 61 located above the first gas inlet adapter 112, a second clamping portion 62 located above the liquid inlet adapter 114, and a third clamping portion 63 located between the first gas outlet adapter 113 and the liquid outlet adapter 115. Here, through a limiting action of three different positions, the ablation cell cover body 4 may be accurately located on the upper opening of the metal abutment 11 and may coincide with the axis of the metal abutment 11 on the axis.

As an example, the first clamping portion 61, the second clamping portion 62 and the third clamping portion 63 each have an inwardly disposed groove to, clamp the edge of the ablation cell cover body 4. The third clamping portion 63 is further provided with a thread adjusting portion 64 for adjusting its own position, and the thread adjusting portion 64 is configured to allow the third clamping portion 63 to approach and clamp the ablation cell cover body 4 after the ablation cell cover body 4 is clamped, by the first clamping portion 61 and the second clamping portion 62.

In operation, for example, the ablation cell cover body 4 may be first placed on the upper opening of the metal abutment 11, and then pushed into the grooves of the first clamping portion 61 and the second clamping portion 62 to realize clamping, and then the thread adjusting portion 64 may be rotated to allow the third clamping portion 63 to approach and clamp the ablation cell cover body 4, so as to realize final positioning.

According to an exemplary embodiment of the present disclosure, when a fluid inclusion sample is observed microscopically (for example, under a microscope, such as by microscopic petrography), light passes through the first through hole 101 via the first light-transmitting glass sheet 102, and irradiates the sample via the third through hole 21 of the cryogenic stage 20 after passing through the second through hole 111. In this way, an operator may adjust the small-volume ablation cell 3 to be positioned above the fluid inclusion components in the sample by microscopically observing the fluid inclusion components in the sample. When the sample is ablated by laser, the laser passes through the fourth through hole 40 via the second light-transmitting glass sheet 41, and is introduced to the surface of the sample on the cryogenic stage 20 after passing through the upper portion of the small-volume ablation cell 3, thereby realizing sample ablation.

According to an exemplary embodiment of the present disclosure, the first through hole 101 has a diameter of for example, about 6 cm (preferably 6 cm). The second through hole 111 has a diameter of, for example, about 6 cm (preferably 6 cm). The cryogenic stage 20 is a silver cryogenic stage and has a diameter of, for example, about 3 cm (preferably 3 cm). The third through hole 21 has a diameter of, for example, about 0.5 cm (preferably 0.5 cm). The fourth through hole 40 has a diameter of, for example, about 3 cm (preferably 3 cm). The small-volume ablation cell 3 has a diameter of, for example, about 1 cm (preferably 1 cm). The fluid inclusion sample is of a disc shape and has a diameter of, for example, about 1 cm (preferably 1 cm).

In some embodiments, the metal abutment has a height of, for example, about 1.5 cm, the cryogenic stage has a height of about 0.5 cm, and the small-volume ablation cell 3 has a height of about 0.8 cm. As an example, the fluid inclusion sample may be formed by wrapping the fluid inclusion components with different host minerals, and may be integrally machined (for example, by slicing or grinding) into a disc shape in order to facilitate measurement. In addition, a plurality of fluid inclusion samples (for example, possibly with the diameter of 0.5 cm) may be directly placed into the small-volume ablation cell 3 and measured at the same time. Or, a standard (or referred to as a standard sample) and a fluid inclusion sample may be placed at the same time for measurement, so as to reduce the number of times for changing the sample and reduce a position effect, which also facilitates the subsequent data processing.

Compared with the prior art, the two-volume cryoablation cell apparatus for LA-ICP-MS analysis of the fluid inclusion according to the exemplary embodiment of the present disclosure has the following advantages. Firstly, since the design of the two-volume ablation cell including the large-volume ablation cell and the small-volume ablation cell is adopted, the apparatus may adapt to the measurement of the fluid inclusion samples with different sizes, showing better flexibility. Secondly, since the volumes of the internal cavities of the large-volume and small-volume ablation cells are somewhat reduced, the aerosols of the fluid inclusion sample may be prevented from being diluted, such that the aerosols of the fluid, inclusion sample may be quickly transferred into the mass spectrometer as many as possible. In addition, since the cryogenic freezing of the cryogenic stage may freeze the fluid inclusion components, which are in a gas/liquid form in the fluid inclusion sample, into a solid-phase state, the loss of the fluid inclusion components due to cracking of the host minerals may be avoided in the laser ablation process, and moreover, the internal pressure of the fluid inclusion components may be effectively reduced, thereby obtaining uniform and stable sample signals about the fluid inclusion components in a longterm, which is convenient for later data processing.

An exemplary embodiment, of the present disclosure further provides a two-volume cryoablation method for LA-ICP-MS analysis of a fluid inclusion, in which the two-volume cryoablation cell apparatus for LA-ICP-MS analysis of the fluid inclusion as provided in the above embodiments is used. The method includes steps S100 to S110.

In S100, a fluid inclusion sample is placed and fixed on the cryogenic stage 20, and the ablation cell cover body 4 is buckled on the upper opening of the metal abutment 11.

In S102, a position of the small-volume ablation cell 3 is adjusted until the small-volume ablation cell 3 is located above the cryogenic stage 20 and contacts the upper surface of the sample.

In S104, light passes through the first through hole 101 via the first light-transmitting glass sheet 102 to irradiate the sample via the third through hole 21 of the cryogenic stage 20 after passing through the second through hole ill. The small-volume ablation cell 3 is adjusted to be positioned above fluid inclusion in the sample by microscopically (for example, under a microscope) observing the fluid inclusion in the sample.

In S106, a helium gas is introduced through the first gas inlet adapter 112, and is discharged via the first gas outlet adapter 113 after passing through the second gas inlet adapter 30 and the second gas outlet adapter 31.

In S108, liquid nitrogen is introduced through the liquid inlet adapter 114 and discharged via the liquid outlet adapter 115 after passing through the cryogenic stage 20.

In S110, laser passes through the fourth through hole 40 via the second light-transmitting glass sheet 41 and is directed to the upper surface, of the sample on the cryogenic stage 20 after passing through the upper portion of the small-volume ablation cell 3 in order to ablate the sample.

Based on the teachings presented in the above descriptions and the associated drawings, many modifications and other embodiments of the present disclosure as set forth herein will conic to the mind of those skilled in the art to which the present disclosure pertains. Therefore, it is to be understood that embodiments of the present disclosure are not limited to the disclosed specific embodiments, and these modifications and other embodiments are intended to be included, within the scope of the present disclosure. In addition, although the above descriptions and associated drawings illustrate the exemplary embodiments in the context of certain exemplary combinations of components and/or functions, it should be appreciated that alternative embodiments can provide different combination forms of the components and/or functions without departing from the scope of the present invention. In this regard, for example, other combination forms of the components and/or functions than those expressly described above are also contemplated to be within the scope of the present disclosure. Although specific terms are used herein, they are used only in a generic and descriptive sense rather than in a restrictive sense.

What is claimed is:

1. A two-volume cryoablation cell apparatus for LA-ICP-MS analysis of a fluid inclusion, comprising:
    an ablation cell base, having a square metal substrate and a metal abutment disposed on the metal substrate and shaped as a hollow cylinder, wherein the ablation cell base forms a large-volume ablation cell, wherein
    a middle portion of the metal substrate has a first through hole and is provided with a first light-transmitting glass sheet;
    the metal abutment is coincident with the metal substrate on an axis, and has a second through hole arranged along the axis; an upper opening of the second through hole is configured to allow a fluid inclusion sample to be placed therethrough, and a lower opening of the second through hole is aligned to the first through hole and configured to guide light transmitted through the first light-transmitting glass sheet;
    a first gas inlet adapter for introducing a helium gas, a first gas outlet adapter for discharging the helium gas, a liquid inlet adapter for introducing liquid nitrogen, a liquid outlet adapter for discharging the liquid nitrogen and a position adjusting knob are disposed on a peripheral wall of the metal abutment;
    a cryogenic component, comprising a cryogenic stage disposed on the axis of the metal abutment and configured to hold the sample, wherein the cryogenic stage has a fluid channel inside and is provided, on an axis thereof, with a third through hole for transmitting light, and the fluid channel has one end connected with the liquid inlet adapter via a liquid inlet pipeline and the other end connected with the liquid outlet adapter via a liquid outlet pipeline;
    a small-volume ablation cell, positioned above the cryogenic stage and in contact with an upper surface of the sample during use, the small-volume ablation cell being of a hollow cylindrical shape with a transparent closed upper portion and an open lower portion, wherein
    the small-volume ablation cell is provided with a second gas inlet adapter on a side wall near a lower portion thereof and a second gas outlet adapter on a side wall near an upper portion thereof, wherein the second gas inlet adapter is connected with the first gas inlet adapter via a hose, and the second gas outlet adapter is connected with the first gas outlet adapter via a hose;
    the small-volume ablation cell is integrally installed on a mobile support which is provided therein with a thread matched with a screwing portion; the screwing portion is provided with the position adjusting knob on the peripheral wall of the metal abutment, so as to drive the mobile support and adjust a position of the small-volume ablation cell when the position adjusting knob is rotated; and an axis of the screwing portion is aligned with the axis of the cryogenic stage;
    and,
    an ablation cell cover body, which is capable of being buckled on the upper opening of the metal abutment during use, and seals the sample within the metal abutment, wherein a middle portion of the ablation cell cover body has a fourth through hole and is provided with a second light-transmitting glass sheet;
    wherein the first gas inlet adapter and the first gas outlet adapter are arranged along a first direction, the liquid inlet adapter and the liquid outlet adapter are arranged along a second direction, and the first direction and the second direction are perpendicular to each other.

2. The two-volume cryoablation cell apparatus for LA-ICP-MS analysis of the fluid inclusion according to claim 1, wherein the peripheral wall of the metal abutment is further provided with a clamping portion for clamping the ablation cell cover body; and after the ablation cell cover body is clamped to the clamping portion, the axis of the ablation cell cover body is capable of coinciding with the axis of the metal abutment.

3. The two-volume cryoablation cell apparatus for LA-ICP-MS analysis of the fluid inclusion according to claim 2, wherein the clamping portion comprises a first clamping portion located above the first gas inlet adapter, a second clamping portion located above the liquid inlet adapter, and a third clamping portion located between the gas outlet adapter and the liquid outlet adapter, wherein
    the first clamping portion, the second clamping portion and the third clamping portion each have an inwardly disposed groove to clamp an edge of the ablation cell cover body; the third clamping portion is further provided with a thread adjusting portion for adjusting a position of the third clamping portion, and the thread adjusting portion is configured to allow the third clamping portion to approach and clamp the ablation cell cover body after the ablation cell cover body is clamped by the first clamping portion and the second clamping portion.

4. The two-volume cryoablation cell apparatus for LA-ICP-MS analysis of the fluid inclusion according to claim 3, wherein the position adjusting knob is located between the first gas inlet adapter and the liquid outlet adapter or between the first gas outlet adapter and the liquid inlet adapter; and
    the ablation cell cover body, the cryogenic stage, the metal abutment and the metal substrate are arranged from top to bottom, and coincide with each other on the axis.

5. The two-volume cryoablation cell apparatus for LA-ICP-MS analysis of the fluid inclusion according to claim 1, wherein the mobile support is of a square shape, and one end of the mobile support away from the screwing portion is provided with an elastic clamping portion, which is configured to clamp the small-volume ablation cell; and
    the small-volume ablation cell is integrally formed from a glass material, and a position of the small-volume ablation cell is adjusted to be above the cryogenic stage by the mobile support during use.

6. The two-volume cryoablation cell apparatus for LA-ICP-MS analysis of the fluid inclusion according to claim 1, wherein the first gas outlet adapter is communicated with a first end of a three-way adapter via a hose, a second end of the three-way adapter is introduced with a helium gas, and a third end of the three-way adapter is configured to discharge the gas; and the gas in the small-volume ablation cell flows into the first end of the three-way adapter via the first gas outlet adapter and flows out via the third end, under the action of the three-way adapter.

7. The two-volume cryoablation cell apparatus for LA-ICP-MS analysis of the fluid inclusion according to claim 6, wherein the first end is located on a first branch of the three-way adapter, the second end is located on a second branch of the three-way adapter, and the third end is located on a third branch of the three-way adapter; the second branch and the third branch are arranged in one direction, and the first branch is perpendicular to the second branch and the third branch; the second branch has a constriction design near the first branch, and the third branch has a constriction design near the first branch.

8. The two-volume cryoablation cell apparatus for LA-ICP-MS analysis of the fluid inclusion according to claim 1, wherein when the sample is observed microscopically, light passes through the first through hole via the first light-transmitting glass sheet, and irradiates the sample via the third through hole of the cryogenic stage after passing through the second through hole; and when the sample is ablated by laser, the laser passes through the fourth through hole via the second light-transmitting glass sheet, and is introduced to the surface of the sample on the cryogenic stage after passing through the upper portion of the small-volume ablation cell.

9. A two-volume cryoablation method for LA-ICP-MS analysis of a fluid inclusion, in which the two-volume cryoablation cell apparatus for LA-ICP-MS analysis of the fluid inclusion defined in claim 1 is used, wherein the method comprises:

placing and fixing the fluid inclusion sample on the cryogenic stage, and buckling the ablation cell cover body on the upper opening of the metal abutment;

adjusting a position of the small-volume ablation cell until the small-volume ablation cell is located above the cryogenic stage and contacts the upper surface of the sample;

passing light through the first through hole via the first light-transmitting glass sheet to irradiate the sample via the third through hole of the cryogenic stage after passing through the second through hole, and adjusting the small-volume ablation cell to be positioned above fluid inclusion components in the sample by microscopically observing the fluid inclusion components in the sample;

introducing the helium gas through the first gas inlet adapter, and discharging the helium gas via the first gas outlet adapter after the helium gas passes through the second gas inlet adapter and the second gas outlet adapter;

introducing liquid nitrogen through the liquid inlet adapter and discharging the liquid nitrogen via the liquid outlet adapter after the liquid nitrogen passes through the cryogenic stage; and passing laser through the fourth through hole via the second light-transmitting glass sheet and directing the laser to the upper surface of the sample on the cryogenic stage after the laser passes through the upper portion of the small-volume ablation cell in order to ablate the sample.

\* \* \* \* \*